D. Treadwell.
Manufacture of Cannon.
No 1272. Reissued Feb. 4. 1862.
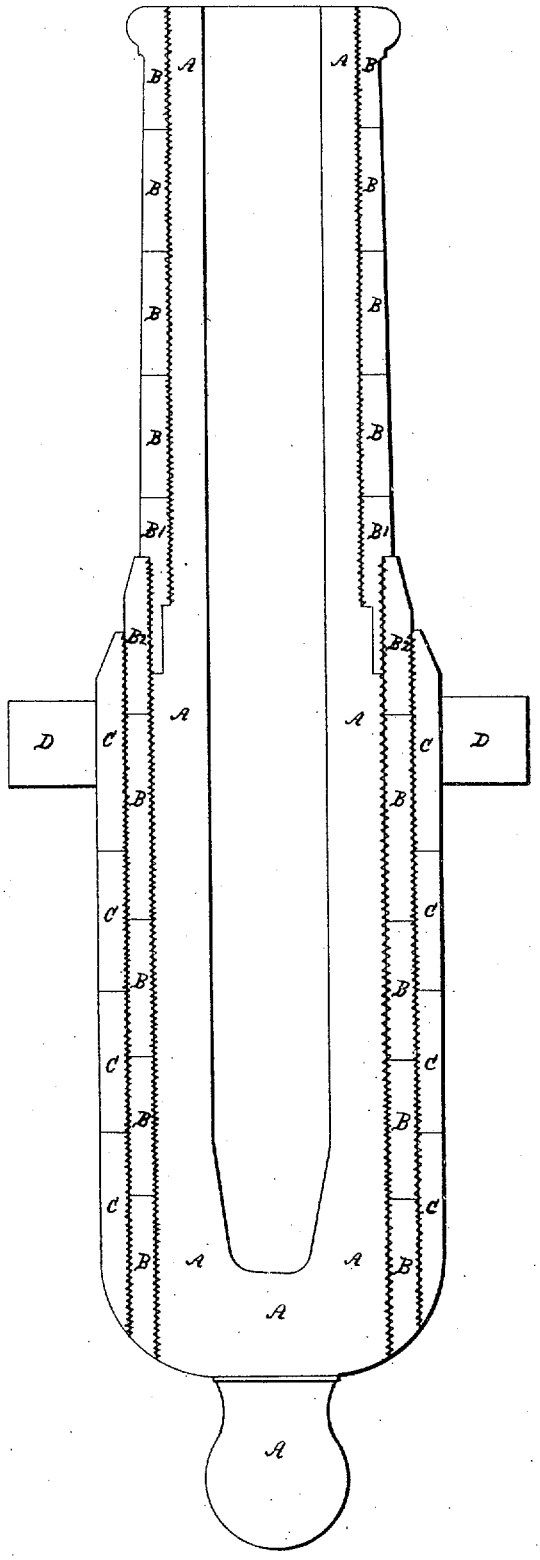
WITNESSES.
Wm Whiting
W. H. Busell
INVENTOR.
Danl Treadwell.

UNITED STATES PATENT OFFICE.

DANIEL TREADWELL, OF CAMBRIDGE, MASSACHUSETTS.

IMPROVEMENT IN THE MANUFACTURE OF CANNON.

Specification forming part of Letters Patent No. 13,927, dated December 11, 1855; Reissue No. 1,272, dated February 4, 1862.

*To all whom it may concern:*

Be it known that I, DANIEL TREADWELL, of Cambridge, in the State of Massachusetts, engineer, a citizen of the United States, have invented a new and useful Improvement in Making Cannon; and I hereby declare the following to be a true description and specification of my said improvement, to wit:

I first cast a cannon in the usual manner, but having in its largest part a diameter only about twice as great as the caliber intended to be bored in it. I then bore it and turn the outside, making two or three cylinders, as represented at A A in the drawing hereto annexed, one of these cylinders, extending from the breech to a little beyond the trunnions, being somewhat larger than the others, that extend from near the trunnions to the muzzle. Upon these cylinders I cut a screw, formed of about eight threads, each thread taking about an eighth of an inch space, so that one turn advances each thread about an inch. I then form several hoops or rings of wrought-iron. (Represented at B B B, &c., in section.) These hoops are turned upon the inside, and have a female screw cut upon their inner surface, to fit the thread, before described as cut upon the cast-iron cylinders forming the gun-body. They are to be finished, however, about one one-thousandth ($\frac{1}{1000}$) part of their internal diameter less in diameter than the male screw that they are to encircle. They are then heated to expand them sufficiently to turn them onto their place or places, as shown in the drawings. It will be seen that the hoop marked B must be first put in its place, and a portion of its outer side turned, and have the threads formed upon it before the hoop $B^2$, that partly covers it, can be put in its place. When one cover of hoops, B B B, &c., are arranged as herein described and shown, I place the gun again in the lathe and turn the outside of these first series of hoops, and cut thereon a screw formed of several threads, as was before done upon the cast-iron body. (This may be done upon all, or only, as shown in the figure, upon those from the breech to the trunnions, inclusive.) I then form another set of hoops, C C C, &c., with female screws corresponding to the male screws upon the first series, and the diameter being one one-thousandth part less than the screw they are to cover. I expand them by heat, as was practiced with the first set, and let them shrink on in place, as they are shown in the drawings. One of these hoops has the trunnions forged upon it, as shown at D D. It will be noticed that the series C C break joints over B B. The drawing is a section of the cannon made through its axis, and the several parts cannot fail to be at once known and understood. The proportions in the drawing are intended for a cannon of twelve inches caliber.

Having thus stated with sufficient minuteness the method of manufacturing a cannon according to my improved method, I now proceed to describe the principle or principles to which a cannon thus formed owes its great superiority over those constructed in the ordinary way.

About thirty years ago Mr. Peter Barlow, of Woolwich, published a paper in the transactions of the Society of Civil Engineers on the hydrostatic press, in which he showed that hollow cylinders of the same materials do not increase in strength in the ratio of increase in thickness, but that the ratio of increase of strength is such that where they become of considerable thickness the strength falls enormously below that given by the ratio of thickness. The law of the diminution in the power of resistance may be stated as follows: Suppose such a cylinder to be made up of a great number of thin rings or hoops, placed one within another, and exactly fitting, so that the particles of each hoop shall be in equilibrium with each other. Then the resistance of these rings, compared one with another, to any distending force, will be inversely as the squares of their diameters. With these incontrovertible laws of resistance before us, we cannot fail to perceive how impossible it must be to increase the strength of cast-iron cannon in any useful degree by an increase of their thickness beyond that now given to them.

Now, to obviate the great cause of weakness arising from the conditions before recited, and to obtain, as far as may be, the strength of wrought-iron, instead of that of cast-iron, for cannon, I have invented the following mode of construction: I form a body for the gun, containing the caliber and breech as now formed of cast-iron, but with walls of only about half the thickness of the diameter of the bore. Upon this body I place rings or hoops of wrought-iron in one, two, or more layers. Every hoop is formed with a screw or thread upon its inside to fit to a corresponding screw or thread formed upon the body of the gun first, and afterward upon each layer that is embraced by another layer. These hoops are made a little—say one one-thousandth part of their diameters—less upon their insides than the parts that they inclose. They are then expanded by heat, and, being turned onto their places, suffered to cool, when they shrink and compress first the body of the gun, and afterward each successive layer all that it incloses. This compression must be made such that when the gun is subjected to the greatest force, the body of the gun and the several layers of rings will be distended to the fracturing-point at the same time, and thus all take a portion of the strain up to its bearing capacity.

There may at the first view seem to be a great practical difficulty in making the hoops of the exact size required to produce the necessary compression. This would be true if the hoops were made of cast-iron or any body which fractures when extended in the least degree beyond the limit of its elasticity; but wrought-iron and all malleable bodies are capable of being extended without fracture much beyond their power of elasticity. They may, therefore, be greatly elongated without being weakened; hence we have only to form the hoops small in excess, and they will acccommodate themselves under the strain without the least injury. It will be found best in practice, therefore, to make the difference between the diameters of the hoops and the parts which they surround considerably more than one one-thousandth part of a diameter. It will be seen that with a gun made in this way we must depend upon the cast-iron body to resist the strain tending to produce cross-fracture, though this resistance will be in some degree supported by the outer rings breaking joint over the inner rings. It will moreover be advantageous to make the threads of the female screws sensibly finer than those of the male, to draw, by the shrink, the inner rings together endwise. By this means (as herein set forth) a gun may be made nearly four times as strong as a cast-iron gun of the same weight, wrought-iron being taken at only twice the strength of cast-iron.

I do not claim a patent for using hoops generally in making cannon, as the earliest cannon known were formed, in part, by hoops brazed upon them; but My invention for which I claim Letters Patent consists—

1. In making a cannon consisting of a body (in which the caliber is formed) the walls of which are of one piece surrounded by rings, hoops, or tubes in one or more layers, placed upon said body under great strain, by which said body is compressed, and the natural equilibrium of the molecules or particles of which it is composed disturbed by their being brought nearer together, and this is accomplished in the manner herein set forth—namely, by making the hoops smaller than the parts which they are to surround, and then expanding them by heat, and then suffering them to shrink or contract after having been put in their places.

2. The method of securing the hoops to the body of the gun, and the several layers of hoops to each other by screw-threads when they shrink to their places, as above described.

DANL. TREADWELL.

Witnesses:
W. G. RUSSEL,
WM. WHITING.